US011129392B2

(12) United States Patent
Teurlinx et al.

(10) Patent No.: US 11,129,392 B2
(45) Date of Patent: Sep. 28, 2021

(54) METHOD AND SYSTEM FOR THE PROCESSING OF CLUSTERS OF POULTRY VISCERA

(71) Applicant: Marel Poultry B.V., Boxmeer (NL)

(72) Inventors: Engelbertus Johannes Jacobus Teurlinx, Boxmeer (NL); Richard Jozef De Schutter, Boxmeer (NL); Roger Pierre Hubertus Maria Claessens, Boxmeer (NL)

(73) Assignee: Marel Poultry B.V., Boxmeer (NL)

( * ) Notice: Subject to any disclaimer, the term of this patent is extended or adjusted under 35 U.S.C. 154(b) by 209 days.

(21) Appl. No.: 16/330,009

(22) PCT Filed: Nov. 9, 2017

(86) PCT No.: PCT/NL2017/050725
§ 371 (c)(1),
(2) Date: Mar. 1, 2019

(87) PCT Pub. No.: WO2018/093249
PCT Pub. Date: May 24, 2018

(65) Prior Publication Data
US 2020/0404932 A1    Dec. 31, 2020

(30) Foreign Application Priority Data
Nov. 15, 2016 (NL) .................................. 2017795

(51) Int. Cl.
A22C 17/00       (2006.01)
A22C 17/16       (2006.01)
A22C 21/00       (2006.01)

(52) U.S. Cl.
CPC .......... *A22C 17/16* (2013.01); *A22C 21/0053* (2013.01)

(58) Field of Classification Search
CPC ...... A22C 21/0053; A22C 21/06; A22C 17/16
(Continued)

(56) References Cited

U.S. PATENT DOCUMENTS 3,480,991 A * 12/1969 Edwards, Sr. ......... A22C 21/06
452/111
4,057,875 A * 11/1977 Hill ......................... A22C 17/14
452/112

(Continued)

FOREIGN PATENT DOCUMENTS

| EP | 1222858 A2 | 7/2002 |
| SU | 1279573 A2 | 12/1986 |
| WO | 00/33661 | 6/2000 |

OTHER PUBLICATIONS

International Search Report, International Patent Application No. PCT/NL2017/050725, dated May 15, 2018, 6 pages.

*Primary Examiner* — Richard T Price, Jr.
(74) *Attorney, Agent, or Firm* — Casimir Jones, S.C.; Brian F. Bradley

(57) ABSTRACT

The invention relates to a system and method for processing clusters of poultry viscera, at least comprising a gizzard. The method comprises conveying the clusters of viscera in a suspended manner, pulling the gizzard of each cluster of viscera, while the latter are being conveyed in a suspended manner, over two elongate scraper bodies which rotate about respective rotation axes, each of the scraper bodies comprising at least one scraper element, wherein, due to the rotation of the two scraper bodies, gizzard fat which is present on a gizzard wall is separated from the gizzard by the scraper elements while the gizzard is being pulled, and collecting the gizzard fat which has been separated from the gizzard of the successive clusters of viscera.

22 Claims, 4 Drawing Sheets

Figure 1:
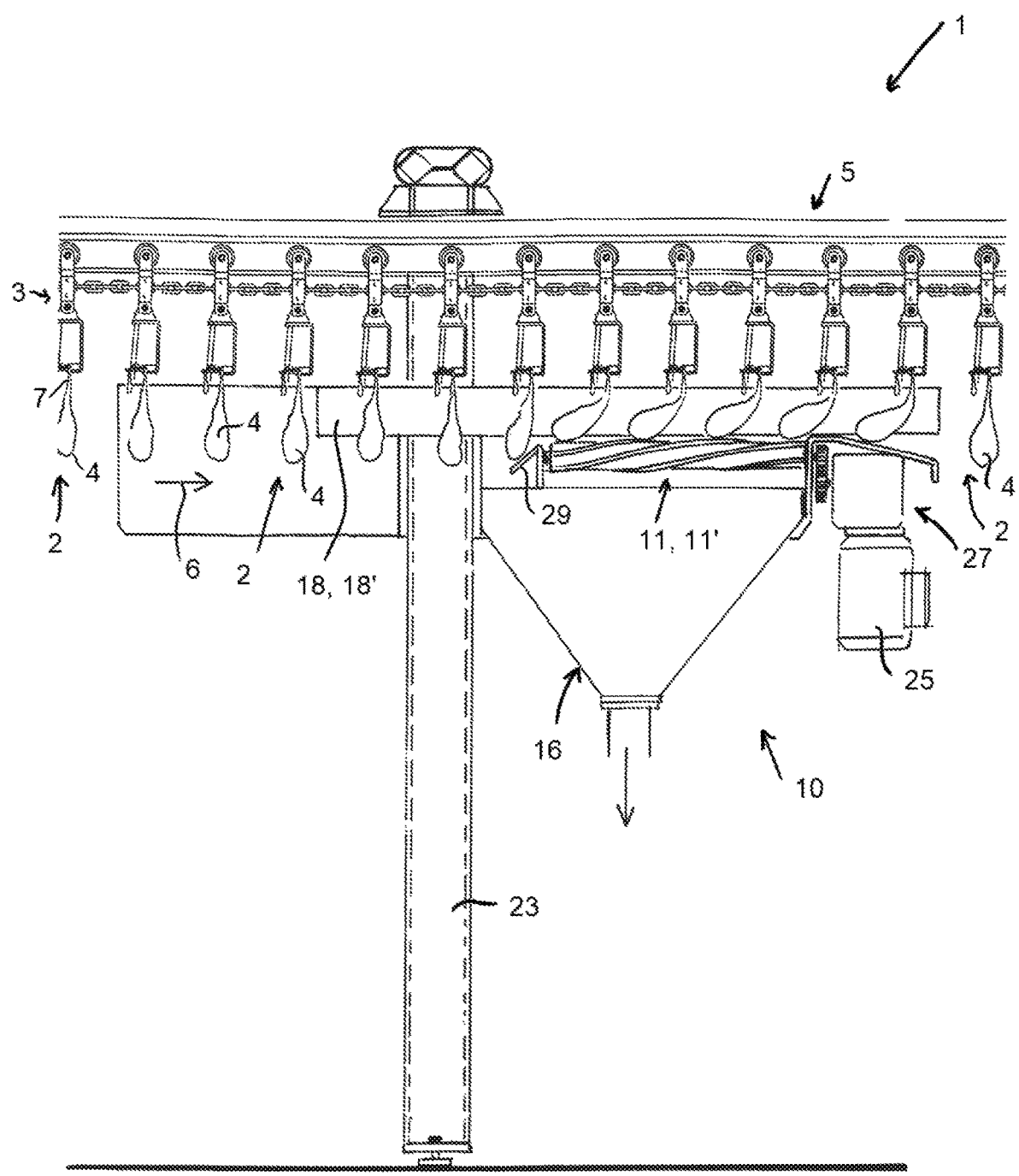

(58) Field of Classification Search
USPC .......................................... 452/106, 111, 112
See application file for complete search history.

(56) References Cited

U.S. PATENT DOCUMENTS

| | | | | |
|---|---|---|---|---|
| 4,434,526 | A | * | 3/1984 | van Mil ................. A22C 21/06 |
| | | | | 452/112 |
| 4,590,643 | A | | 5/1986 | Hill |
| 5,041,053 | A | * | 8/1991 | Ellis ....................... A22C 21/06 |
| | | | | 452/106 |
| 5,098,336 | A | * | 3/1992 | DeLong ................. A22B 5/166 |
| | | | | 452/111 |
| 5,186,678 | A | * | 2/1993 | Conner .................. A22C 21/06 |
| | | | | 452/106 |
| 5,810,651 | A | | 9/1998 | De Heer |
| 2009/0042497 | A1 | * | 2/2009 | Sorensen ........... A22C 21/0053 |
| | | | | 452/117 |

\* cited by examiner

METHOD AND SYSTEM FOR THE PROCESSING OF CLUSTERS OF POULTRY VISCERA

The present invention relates to a method and a system for processing clusters of poultry viscera.

EP 1 222 858 discloses a method and device for removing a cluster of viscera from a slaughtered animal.

It is an object of the present invention to provide a method for processing clusters of poultry viscera, in which the clean harvesting of gizzard fat, in other words free from contamination, is possible in an efficient manner. Such clean gizzard fat is suitable for further processing, for example for processing the gizzard fat in food products, such as for example hamburgers, nuggets, minced meat, sausages. Use of the gizzard fat in the chemical industry is also possible, such as for the production of lipsticks and the like.

The aforementioned object is achieved by the method according to the present invention, as defined in claim 1, for processing clusters of poultry viscera, wherein each of the clusters of viscera is separated from a carcass, comprises at least a gizzard and is free from gall and intestines. The method according to the invention comprises:
- conveying the successive clusters of viscera in a suspended manner along a processing trajectory in a conveying direction,
- pulling (dragging) the gizzard of each cluster of viscera, while the latter are being conveyed in a suspended manner, over two elongate, juxtaposed scraper bodies which rotate in mutually opposite directions of rotation about respective rotation axes and extend in the conveying direction, each of the scraper bodies comprising at least one scraper element, wherein, due to the rotation of the two scraper bodies, gizzard fat which is present on a gizzard wall is separated from the gizzard by the scraper elements while the gizzard is being pulled, and
- collecting the gizzard fat which has been separated from the gizzard of the successive clusters of viscera.

An effect of the method according to the present invention is that by pulling the poultry gizzard in a suspended manner over the rotating scraper bodies, the gizzard fat which is present on the gizzard wall is harvested in such a way that it cannot come into contact with other viscera and/or parts pertaining to the poultry, such as the gizzard contents, as a result of which the gizzard fat remains clean during harvesting and is thus useful for a plurality of applications as a high-quality raw material, such as the applications mentioned above. Furthermore, the gizzard fat is valuable as the gizzard fat, in particular chick fat, is a high-quality and easily digestible fat. This fat has similar properties to vegetable fat. Such fat is also referred to as category 1 edible fat.

In addition, according to the invention, the harvesting may take place in a continuous manner, that is to say during a continuous movement of the gizzard, which is particularly efficient and makes it possible to incorporate the method in a processing process for poultry in which poultry or clusters of poultry viscera is successively, preferably at an equal intermediate distance, viewed in the conveying direction, conveyed past several processing stations while suspended from a conveying member, such as a conveyor chain.

Preferably, each of the clusters of viscera is also free from the liver. Preferably, each of the clusters of viscera at least comprises the gizzard, on which gizzard fat is present, and the gullet or at least a part thereof which is connected to the gizzard. Furthermore, each of the clusters of viscera may comprise the heart and the lungs.

In an embodiment, the method comprises the further step of conveying the clusters of viscera between two guide members which extend in the conveying direction, in which at least the gizzard of each cluster of viscera is consequently guided onto the two scraper bodies. This increases the reliability of the method, as it is ensured that the gizzards are guided onto the scraper bodies during suspended transportation, to a high degree irrespective of, for example, differences in size of the gizzards.

In a preferred embodiment, the two guide members are elongate, with the gizzard being situated between the two guide members while it is being pulled over the scraper bodies, preferably from upstream of the scraper bodies, more preferably also as far as downstream of the scraper bodies. As a result thereof, it is ensured during the entire pulling process, and thus during the entire scraping treatment, that the gizzards are pulled over the two scraper bodies and do not inadvertently end up, for example, on a side of one of the two scraper bodies, outside the reach of the other of the two scraper bodies, as a result of which the scraping process would be less effective.

It is advantageous if at least one of the scraper elements is a flexible projection of the scraper body, provided on a base part of the scraper body. Preferably, at least one of the scraper elements is flexible. In a preferred embodiment, the scraper element of one of the two scraper bodies touches the other scraper body during rotation of the two scraper bodies. In this case, the scraper element of one of the two scraper bodies preferably touches the base part of the other scraper body. In an embodiment, the scraper elements are strip-shaped.

The cluster of viscera may comprise a gullet and/or windpipe. During transportation, the cluster of viscera may be suspended by the gullet and/or windpipe, preferably by the gullet.

In a preferred embodiment, the method comprises the further step of separating intestines, gall and/or liver from the clusters of viscera upstream of the scraper bodies during the suspended transportation and/or the method comprises the step of separating the heart and/or the lungs from the clusters of viscera after pulling the clusters of viscera over the two scraper bodies during the suspended transportation.

It is advantageous if at least one of the scraper elements is provided at such an angle to the rotation axis of the associated scraper body that the scraper element exerts an active force in a direction opposite to the conveying direction while the gizzard is being pulled over the scraper bodies. The scraper element may be provided in the shape of a spiral along a circumferential surface of the scraper body, that is to say the base part thereof. In one embodiment, the spiral-shaped scraper element has a pitch, that is to say displacement per turn, which is directed counter to the conveying direction. As a result of this direction of the pitch, the aforementioned active force is exerted on the gizzard in the opposite direction while the latter is being pulled in the conveying direction. The expression active force is understood to mean a force which is not just a reaction force resulting from friction between the gizzard and the scraper bodies. As a result of the mutually opposite directions of rotation of the two scraper bodies, the angle of the two scraper elements with respect to the associated respective rotation axis is therefore opposite. The one spiral shape rotates counterclockwise, whereas the other spiral shape rotates clockwise.

The preferred embodiments of the method according to the invention described above correspondingly apply to the system according to the present invention which is described below in greater detail, and preferred embodiments of the system according to the invention to be described below correspondingly apply to the above-described method according to the present invention.

The present invention also relates to a system according to claim 9 for processing, preferably according to a method according to the present invention, clusters of poultry viscera, wherein each cluster of viscera of the clusters of viscera is separated from a carcass, comprises at least a gizzard and is free from gall and intestines, the system comprising:

- a conveyor configured for conveying the successive clusters of viscera in a suspended manner along a processing trajectory in a conveying direction,
- a station which is provided next to the conveyor and is configured for separating gizzard fat from the gizzard of each of the clusters of viscera, the station comprising two elongate, juxtaposed scraper bodies which are rotatable in mutually opposite directions about respective rotation axes and extend in the conveying direction, which are provided in such a manner that, in use, the gizzard of each cluster of viscera is pulled over the scraper bodies, each of the scraper bodies comprising at least one scraper element, wherein the scraper bodies are configured for, in use, separating gizzard fat situated on a wall of the gizzard from the gizzard during pulling due to the rotation of the two scraper bodies, using the at least one scraper element, in order thus to be able to collect the gizzard fat which has been separated from the gizzards of successive clusters of viscera.

Advantages of the system according to the present invention are analogous to the above-described advantages of the method according to the present invention.

It is advantageous if the system further comprises a collecting device, configured for collecting the gizzard fat which has been separated from the gizzards of successive clusters of viscera.

In an embodiment, at least one of the, preferably all, scraper elements is a flexible projection of the scraper body. Preferably, at least one of the, preferably all, scraper elements is made of a plastic, preferably of polyurethane.

In a simple embodiment which is advantageous from the point of view of costs, the two elongate scraper bodies have an at least substantially round cross section. In this case, the respective scraper elements may be formed by a projection on a circumferential surface of a base part of the scraper body. It is advantageous in this case for efficiently separating the gizzard fat from the gizzard, if, in use, the two scraper bodies rotate in mutually opposite directions in such a way that gizzard fat is forced downward and between the scraper bodies.

The base part may be made of a metal, preferably of stainless steel. The base part may be cylindrical, with a central axis which coincides with the rotation axis.

Preferably, at least one, preferably two, of the scraper elements is elongate and extends in a longitudinal direction of the scraper bodies.

In this case, the at least one elongate scraper element is preferably provided on the scraper body, preferably on the base part thereof, in the form of a spiral.

In order to be able to maintain the system in an efficient manner, it is advantageous if at least one of the, preferably two, scraper elements is provided on the associated scraper body in a detachable way. In the case of an elongate scraper element, the scraper element preferably has a thickened longitudinal edge and the base part of the scraper body has a slot, the shape of which is adapted to the thickened longitudinal edge, so that, during maintenance, a scraper element can be pushed into the slot from one end of the slot, such as at the location of a head end of the scraper body, in which case this is confined for radial movement, that is to say is accommodated in a form-fitted manner. The thickened longitudinal edge may, for example, have a round, (truncated) triangular, quadrangular, or T-shaped shape. The shape of the slot is then accordingly, for example, round, triangular, quadrangular or T-shaped.

It is advantageous if the station comprises two guide members which extend in the conveying direction in order to convey the clusters of viscera between them so as to guide at least the gizzard of each cluster of viscera onto the two scraper bodies as a result thereof.

In an embodiment, the two guide members are provided at the location of an upstream end of the scraper bodies, in an embodiment only just upstream, adjacent to the scraper bodies, with the two guide members narrowing in the conveying direction in order to guide the gizzards onto the scraper bodies in an efficient way.

In an embodiment, the two guide members are elongate and extend in the conveying direction.

In this case, the two elongate guide members are formed by two elongate guide plates which each, viewed in the conveying direction, form a guide face which extends in a height direction, preferably widening in the upward direction.

It is advantageous in this case if the two scraper bodies are provided under the guide members, preferably directly under the guide members.

It is furthermore advantageous if the system comprises another station which is situated upstream of the station, next to the transportation trajectory, and is configured for removing intestines, gall and/or liver from the clusters of viscera.

It is furthermore advantageous if the system comprises yet another station which is situated downstream from the station, next to the transportation trajectory, and serves for removing heart and/or lungs from the clusters of viscera.

The invention furthermore relates to a scraper element clearly intended for use with an above-described method according to the invention and/or in an above-described system according to the invention, wherein the scraper element is elongate, flexible, and made of a plastic, has a thickened longitudinal edge, which longitudinal edge is adapted to be accommodated in a slot provided in a scraper body in a form-fitted manner, over which, in use, the gizzard of a cluster of poultry viscera is pulled for, in use, separating gizzard fat from a wall of the gizzard using the scraper element. The scraper element is preferably made of polyurethane.

Figure 2:
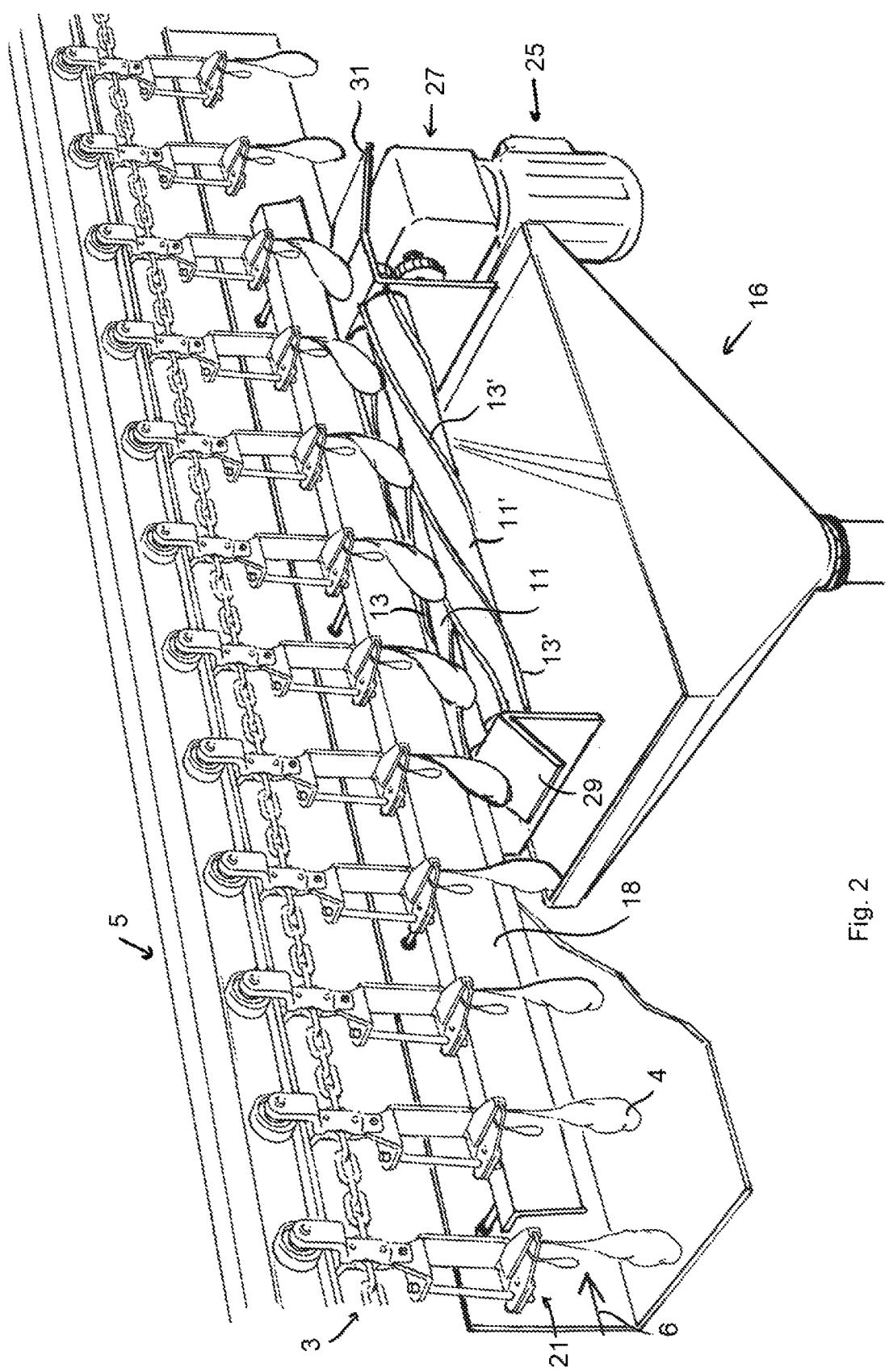
Figure 3:
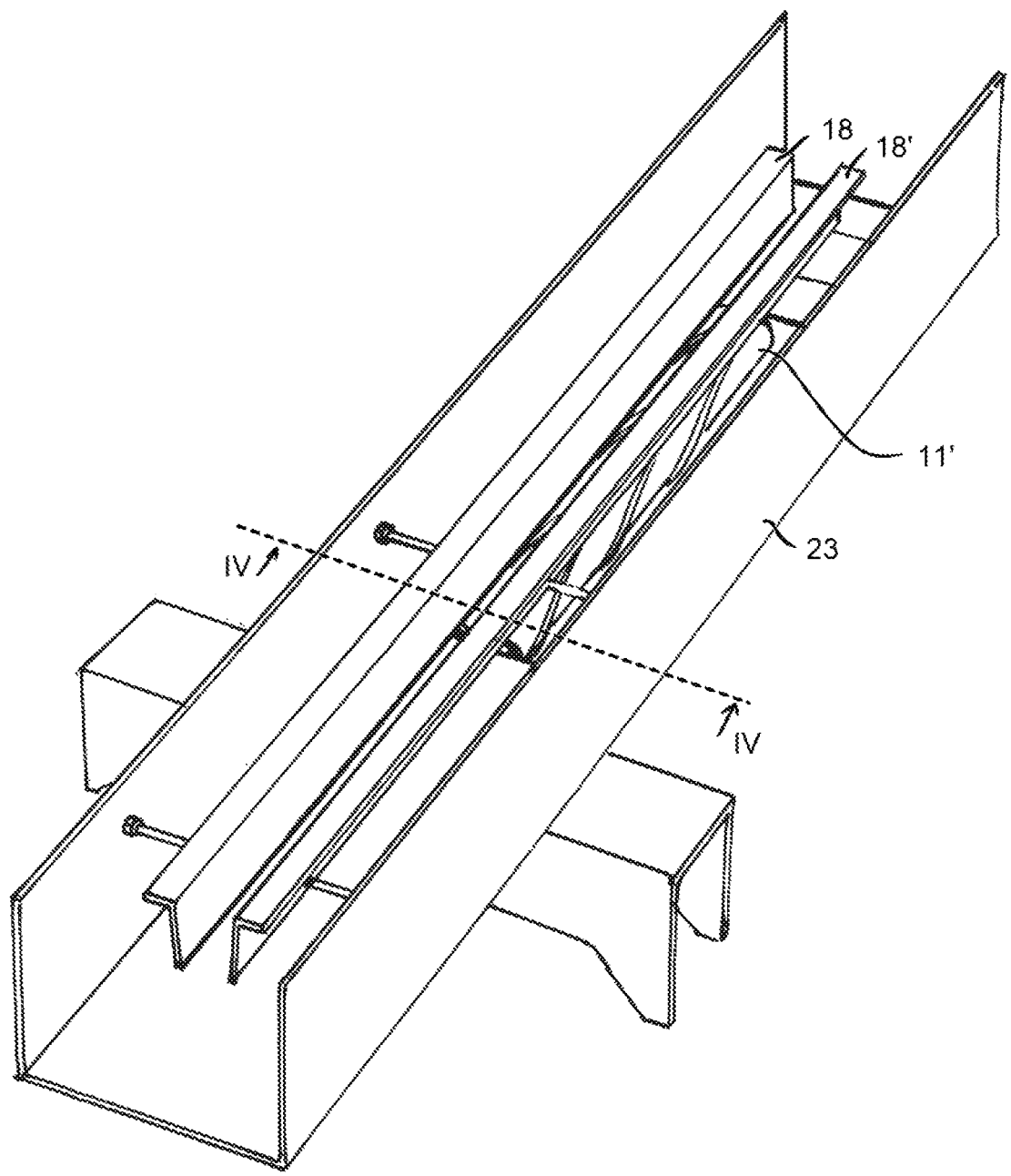
Figure 4:
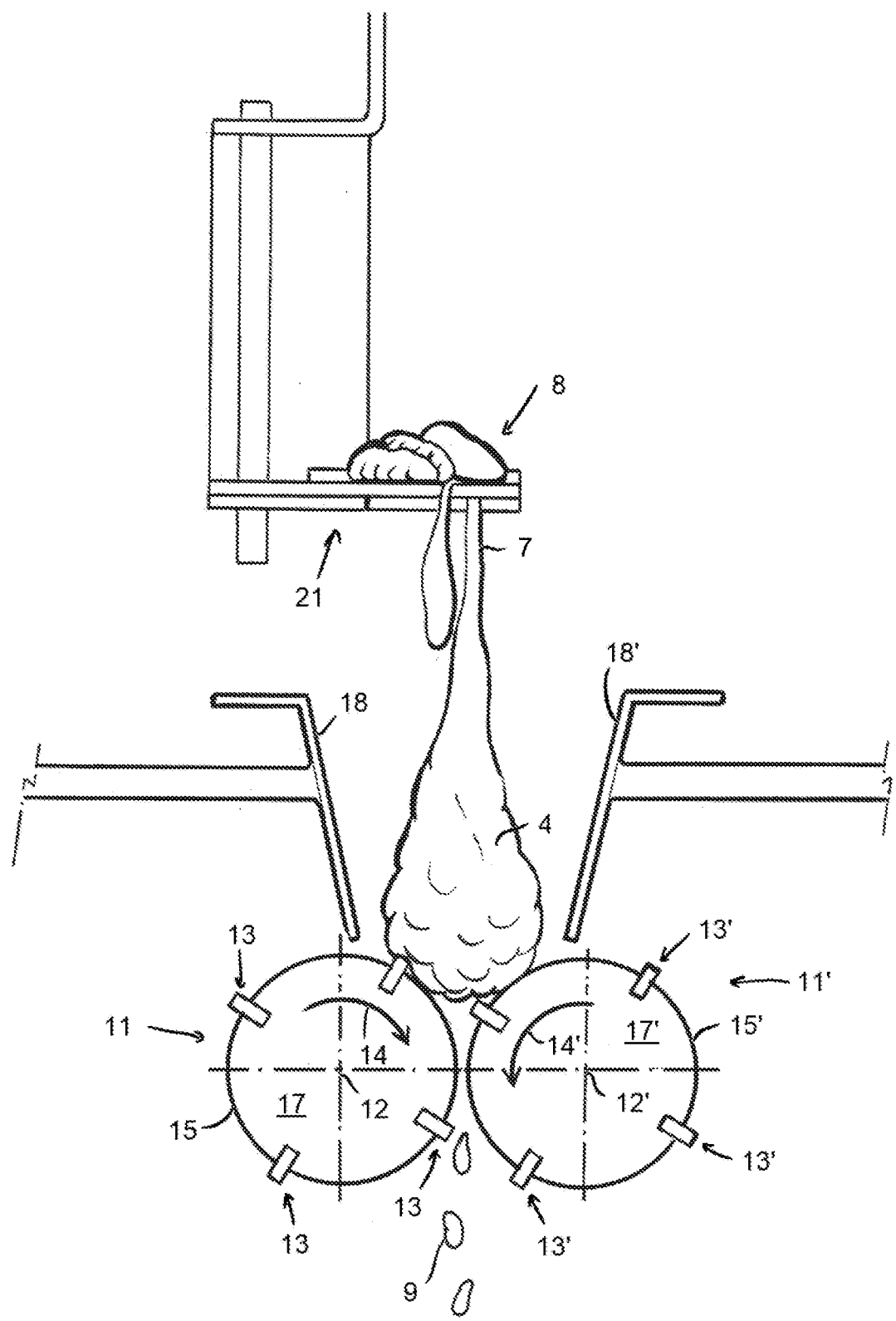

The present invention will be described below by means of the description of a preferred embodiment of a system according to the present invention, with reference to the following figures, in which:

FIG. 1 shows a side view of a preferred embodiment of a system according to the present invention, FIG. 2 shows a three-dimensional view of the system of FIG. 1, FIG. 3 shows a three-dimensional view of a part of the system of FIG. 1, and FIG. 4 shows cross section IV-IV of FIG. 3, in use of the system, and FIGS. 1 and 2 show a system 1 for processing clusters of poultry viscera 2. Each cluster of viscera 2 is separated from the associated carcass. Each cluster of viscera further comprises at least a gizzard 4 and is free from liver, gall and intestines.

The system 1 comprises a conveyor 3, configured for conveying the successive clusters 2 of viscera in a suspended manner along a processing trajectory 5 in a conveying direction 6. The successive clusters 2 of viscera may be suspended, for example, with an intermediate distance of 10 cm, preferably an intermediate distance in the range of 5 to 40 cm. The system 1 has a gizzard fat station 10 which is situated next to the conveyor 3 and is configured to separate gizzard fat 9 (see FIG. 4) from the gizzard 4 of each of the clusters 2 of viscera. The station 10 comprises two elongate, juxtaposed scraper bodies 11, 11' which extend in the conveying direction 6 and are rotatable in mutually opposite directions 14, 14' about respective rotation axes 12, 12', that is to say virtual central lines. The scraper bodies are rotatably driven by an electric drive motor 25 via a gear transmission 27. Rotatable driving can however also take place by other means, such as by hydraulic means and/or directly, without transmission, or via a belt transmission, and/or by a take-off from a drive of the conveyor. These scraper bodies are provided in such a way that, when the system 1 is in use, the gizzard 4 of each cluster of viscera is pulled over the scraper bodies while the clusters 2 of viscera are successively being conveyed along the processing trajectory 5. The two scraper bodies 11, 11' both have a cylindrical base part 17, 17' made of stainless steel on which four scraper elements 13, 13' are provided which are each formed by a flexible projection of the scraper body 11, 11' and are made of polyurethane. Each scraper element 13, 13' is elongate and extends in a longitudinal direction, parallel to the conveying direction 6, of the associated scraper body 11, 11', in a spiral-shaped manner over the cylindrical circumferential surface 15, 15' of the scraper body. The two scraper bodies are provided juxtaposed and parallel to each other in such a way that, in use, during rotation of the two scraper bodies 11, 11', the scraper elements 13 of one scraper body 11 touch the base part 17' of the other scraper body 11' and vice versa. In addition, the two scraper bodies are provided in such a manner that, in use, during pulling, gizzard fat 9 which is situated on a wall of the gizzard 4 is separated from the gizzard by the at least one scraper element 13, 13' as a result of the rotation of the two scraper bodies 11. Due to the fact that the two scraper bodies rotate in mutually opposite directions, towards each other on their upper sides as shown in FIG. 4, gizzard fat 9 is forced downwards and between the scraper bodies when the gizzards 4 are being pulled over the scraper bodies.

With each scraper body, the scraper elements 13, 13' are each accommodated in a form-fitted manner in a slot which extends along the length of the base part 17, 17'. Although not shown in detail in FIG. 4, the cross section of the slot is triangular, with the top of the triangle being situated at the circumferential surface 15, 15', in order to thus bring about a form-fitted connection in cooperation with a correspondingly shaped longitudinal edge of the scraper element which is thickened in a triangle shape. This also makes it possible to fit, and thus also replace, the scraper elements quickly and easily by sliding them into the slot from a head end of the slot.

Under the scraper bodies 11, 11', a collecting device is provided which is formed by a funnel 16, by means of which the gizzard fat 9 which has been separated from the gizzards of successive clusters of viscera is collected. Subsequently, the gizzard fat 9 is discharged further in order to be processed further.

The system 1 further comprises two elongate guide members which extend in the conveying direction 6. The two guide members are formed by two elongate guide plates 18, 18' which, viewed in the conveying direction, each form a guide face which extends in a height direction, preferably widening in an upward direction as shown in FIG. 4. The two guide plates are fixedly connected to a frame 23 of the system. The two scraper bodies 11, 11' are provided directly under the guide plates 18, 18'. The guide plates are placed in such a way with respect to the scraper bodies that the clusters of viscera, more specifically the gizzards 4 thereof, are conveyed in between in order to guide at least the gizzard of each cluster of viscera onto the two scraper bodies 11, 11' as a result thereof. As FIG. 1 shows, an upstream head end of the guide plates 18, 18' is situated upstream of the scraper bodies and a downstream end of the guide plates is situated downstream of the scraper bodies. The station 10 also has an upstream sliding plate 29 over which the gizzards slide just before they pass over the scraper bodies 11, 11'. The sliding plate 29 also helps to guide the gizzards 4 from a freely suspended state onto the scraper bodies in a reliable manner. Downstream of the scraper bodies 11, 11', a further sliding plate 31 is provided for gradually returning the gizzards 4 to a freely suspended state from the scraper bodies 11, 11'.

Although it is not shown in the figures, the system further comprises, upstream of the gizzard fat station, another station which is situated next to the transportation trajectory and is configured for removing intestines, gall and/or liver from the clusters 2 of viscera. Such a station is described, for example, in EP587253. In addition, the system comprises, downstream of the gizzard fat station, yet another station which is situated next to the transportation trajectory for removing heart and/or lungs 8 from the clusters 2 of viscera. Such a station is described, for example, in EP587253.

The above-described system 1 is used as follows in a method according to the invention for processing clusters 2 of poultry viscera, wherein each of the clusters of viscera is separated from a carcass, comprises at least a gizzard 4 and is free from gall and intestines. According to the method, the clusters 2 of viscera are conveyed successively in a suspended manner along the processing trajectory 5 in the conveying direction 6. Each cluster of viscera comprises a gullet 7, from which the gizzard is suspended during transportation. To this end, the conveyor incidentally has suspension clamps 21 for clamping the gullet 7 between them.

The clusters of viscera are conveyed in between the two guide plates 18, 18' which extend in the conveying direction. As a result thereof, at least the gizzard 4 of each cluster of viscera is guided onto the two scraper bodies 11, 11'. The gizzard of each cluster of viscera is then pulled over the two scraper bodies, wherein, due to the rotation of the two scraper bodies, gizzard fat 9 which is present on a wall of the gizzard is separated by the scraper elements 13, 13' of the gizzard while the gizzard is being pulled. Subsequently, the gizzard fat which has been separated from the gizzard of the successive clusters of viscera is collected in the collecting device 16. After the clusters of viscera have been conveyed beyond the scraper bodies, they pass the downstream end of the guide plates and thus leave the gizzard fat station 10.

The invention claimed is:

1. A method for processing clusters of poultry viscera, wherein each of the clusters of viscera is separated from a carcass, comprises at least a gizzard and is free from gall and intestines, the method comprising:
conveying the successive clusters of viscera in a suspended manner along a processing trajectory in a conveying direction,
pulling the gizzard of each cluster of viscera, while the latter are being conveyed in a suspended manner, over two elongate, juxtaposed scraper bodies which rotate in mutually opposite directions of rotation about respective rotation axes and extend in the conveying direction, each of the scraper bodies comprising at least one scraper element,
wherein, due to the rotation of the two scraper bodies, gizzard fat which is present on a gizzard wall is separated from the gizzard by the scraper elements while the gizzard is being pulled, and
collecting the gizzard fat which has been separated from the gizzard of the successive clusters of viscera.

2. The method according to claim 1, comprising the further step of:
conveying the clusters of viscera between two guide members which extend in the conveying direction, in which at least the gizzard of each cluster of viscera is consequently guided onto the two scraper bodies.

3. The method according to claim 2, wherein the two guide members are elongate, with the gizzard being situated between the two guide members while it is being pulled over the scraper bodies.

4. The method according to claim 1, wherein at least one of the scraper elements is a flexible projection of the scraper body, provided on a base part of the scraper body, wherein the scraper element of one of the two scraper bodies touches the other scraper body during rotation of the two scraper bodies.

5. The method according to claim 1, wherein the cluster of viscera comprises a gullet from which the cluster of viscera is suspended during transportation.

6. The method according to claim 1, comprising the further step of:
separating intestines, gall and/or liver from the clusters of viscera upstream of the scraper bodies during the suspended transportation.

7. The method according to claim 1, comprising the further step of:
separating the heart and/or the lungs from the clusters of viscera downstream of the pulling of the clusters of viscera over the two scraper bodies during suspended transportation.

8. The method according to claim 1, wherein at least one of the scraper elements is provided at such an angle to the rotation axis of the associated scraper body that the scraper element exerts an active force in a direction opposite to the conveying direction while the gizzard is being pulled over the scraper bodies.

9. A system for processing clusters of poultry viscera, wherein each cluster of viscera of the clusters of viscera is separated from a carcass, comprises at least a gizzard and is free from gall and intestines,
the system comprising:
a conveyor configured for conveying the successive clusters of viscera in a suspended manner along a processing trajectory in a conveying direction,
a station which is provided next to the conveyor and is configured for separating gizzard fat from the gizzard of each of the clusters of viscera,
the station comprising two elongate, juxtaposed scraper bodies which are rotatable in mutually opposite directions about respective rotation axes and extend in the conveying direction, which are provided in such a manner that, in use, the gizzard of each cluster of viscera is pulled over the scraper bodies, each of the scraper bodies comprising at least one scraper element, wherein the scraper bodies are configured for, in use, separating gizzard fat situated on a wall of the gizzard from the gizzard during the pulling due to the rotation of the two scraper bodies, using the at least one scraper element, in order thus to be able to collect the gizzard fat which has been separated from the gizzards of successive clusters of viscera.

10. The system according to claim 9, further comprising a collecting device configured for collecting the gizzard fat which has been separated from the gizzards of successive clusters of viscera.

11. The system according to claim 9, wherein at least one of the scraper elements is a flexible projection of the scraper body.

12. The system according to claim 9, wherein the two elongate scraper bodies have an at least substantially round cross section, wherein the respective scraper elements are formed by a projection on a circumferential surface of a base part of the scraper body.

13. The system according to claim 9, wherein at least one of the scraper elements is elongate and extends in a longitudinal direction of the scraper bodies.

14. The system according to claim 13, wherein the at least one elongate scraper element is provided on the scraper body in the form of a spiral.

15. The system according to claim 9, wherein at least one of the scraper elements is provided on the associated scraper body in a detachable way.

16. The system according to claim 9, wherein the station further comprises two guide members which extend in the conveying direction in order to convey the clusters of viscera between them so as to guide at least the gizzard of each cluster of viscera onto the two scraper bodies as a result thereof.

17. The system according to claim 16, wherein the two guide members are elongate and extend in the conveying direction.

18. The system according to claim 17, wherein the two elongate guide members are formed by two elongate guide plates which each, viewed in the conveying direction, form a guide face which extends in a height direction.

19. The system according to claim 18, wherein the guide face widens in the upward direction.

20. The system according to claim 16, wherein the two scraper bodies are provided under the guide members.

21. The system according to claim 9, further comprising another station which is situated upstream of the station, next to the transportation trajectory, and is configured for removing intestines, gall and/or liver from the clusters of viscera.

22. The system according to claim 9, further comprising yet another station which is situated downstream from the station, next to the transportation trajectory, and arranged for removing heart and/or lungs from the clusters of viscera.

* * * * *